US011969893B2

(12) United States Patent
Chipalkatty et al.

(10) Patent No.: US 11,969,893 B2
(45) Date of Patent: *Apr. 30, 2024

(54) AUTOMATED PERSONALIZED FEEDBACK FOR INTERACTIVE LEARNING APPLICATIONS

(71) Applicant: Southie Autonomy Works, Inc., Boston, MA (US)

(72) Inventors: Rahul D. Chipalkatty, Boston, MA (US); Raphael Segal, Boston, MA (US); Jay Ming Wong, Quincy, MA (US)

(73) Assignee: Southie Autonomy Works, Inc., Boston, MA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/090,315

(22) Filed: Nov. 5, 2020

(65) Prior Publication Data

US 2021/0046644 A1 Feb. 18, 2021

Related U.S. Application Data

(63) Continuation of application No. 15/962,267, filed on Apr. 25, 2018, now Pat. No. 10,864,633.

(60) Provisional application No. 62/491,532, filed on Apr. 28, 2017.

(51) Int. Cl.
*B25J 9/00* (2006.01)
*B25J 9/16* (2006.01)
*B25J 13/06* (2006.01)
*G05B 19/42* (2006.01)
*G06F 3/01* (2006.01)
*G06F 3/04815* (2022.01)

(52) U.S. Cl.
CPC .............. *B25J 9/163* (2013.01); *B25J 9/0081* (2013.01); *B25J 9/1664* (2013.01); *B25J 13/06* (2013.01); *G05B 19/42* (2013.01); *G06F 3/017* (2013.01); *G06F 3/04815* (2013.01); *G05B 2219/35444* (2013.01)

(58) Field of Classification Search
CPC ........ B25J 9/163; B25J 9/0081; B25J 9/1664; B25J 13/06; B25J 9/1656; G05B 19/42; G05B 2219/35444; G05B 2219/40414; G06F 3/017; G06F 3/04815
See application file for complete search history.

(56) References Cited

U.S. PATENT DOCUMENTS

| 8,918,208 | B1 * | 12/2014 | Hickman | G06F 16/5866 |
| | | | | 700/1 |
| 10,514,768 | B2 * | 12/2019 | Naidoo | G06F 3/042 |
| 10,656,720 | B1 * | 5/2020 | Holz | G06F 3/011 |
| 2005/0256611 | A1 | 11/2005 | Pretlove et al. | |

(Continued)

FOREIGN PATENT DOCUMENTS

EP 1709519 A1 10/2006

*Primary Examiner* — Harry Y Oh
(74) *Attorney, Agent, or Firm* — Morgan, Lewis & Bockius LLP; Tairan Wang

(57) ABSTRACT

A robot-training system permits a user touch, click on or otherwise select items from a display projected in the actual workspace in order to define task goals and constraints for the robot. A planning procedure responds to task definitions and constraints, and creates a sequence of robot instructions implementing the defined tasks.

20 Claims, 6 Drawing Sheets

(56) References Cited

U.S. PATENT DOCUMENTS

| | | | |
|---|---|---|---|
| 2010/0185328 A1* | 7/2010 | Kim | B25J 9/104 700/264 |
| 2011/0288964 A1* | 11/2011 | Linder | B25J 9/1689 700/275 |
| 2012/0166993 A1* | 6/2012 | Anderson | G06F 3/017 715/771 |
| 2013/0050425 A1* | 2/2013 | Im | G06F 3/0304 348/46 |
| 2015/0002391 A1* | 1/2015 | Chen | G06V 40/28 345/156 |
| 2015/0177846 A1* | 6/2015 | Yin | G06V 20/00 382/103 |
| 2015/0290802 A1 | 10/2015 | Buehler et al. | |
| 2015/0309316 A1* | 10/2015 | Osterhout | G06F 3/0488 345/8 |
| 2016/0143693 A1* | 5/2016 | Yilmaz | A61B 6/12 606/130 |
| 2016/0167232 A1 | 6/2016 | Takeshita | |
| 2016/0257000 A1 | 9/2016 | Guerin et al. | |
| 2017/0329460 A1* | 11/2017 | Bae | G06F 3/018 |
| 2018/0173200 A1* | 6/2018 | Atherton | G05B 19/4097 |

* cited by examiner

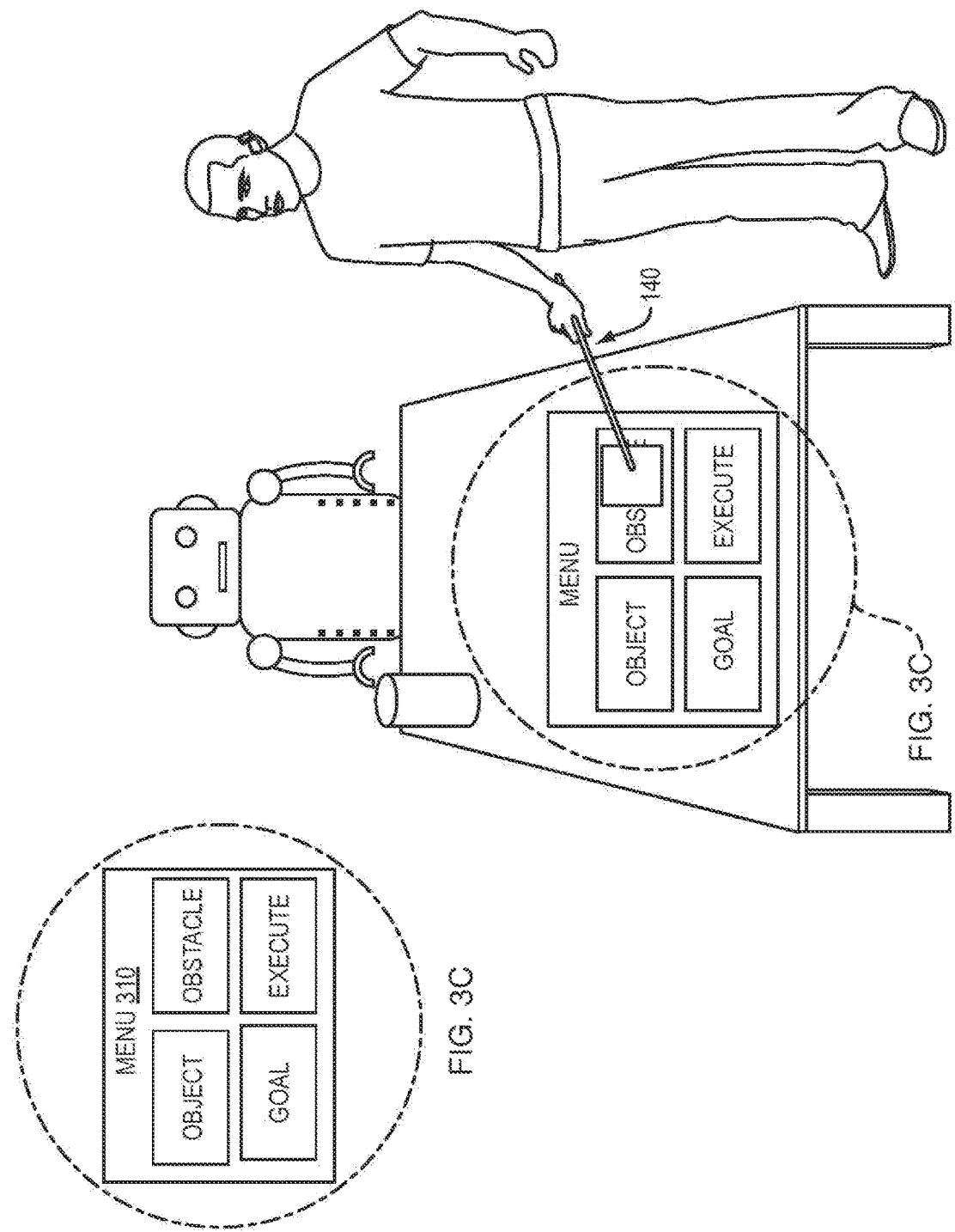

AUTOMATED PERSONALIZED FEEDBACK FOR INTERACTIVE LEARNING APPLICATIONS

CROSS-REFERENCE TO RELATED APPLICATION

This application is a continuation of U.S. patent application Ser. No. 15/962,267, filed Apr. 25, 2018, which claims the benefit of and priority to U.S. Provisional Patent Application No. 62/491,532, filed Apr. 28, 2017, the entire disclosure of each of which is hereby incorporated herein by reference.

FIELD OF THE INVENTION

The field of the invention relates, generally, to robotics, and in particular to robot training involving task goals and constraints.

BACKGROUND

Robots are in widespread use throughout industry, performing an ever-increasing variety of tasks. Although many robots are task-specific, having been designed to execute a particular set of actions in a single manufacturing environment, more versatile robots capable of many tasks have become common. Programming a general-purpose robot to perform a particular set of actions is often a tedious process. The user must somehow communicate to the robot the intent of the task (e.g., pick up this object at this location and place it at a goal location) and the task constraints (e.g., don't hit anything in the workspace). Such task-specific programming can be painstaking and applies only to a specific configuration of the robot and workspace. If the workspace changes, the robot typically must be reprogrammed.

SUMMARY

In order to cut time and skill needed to train a robot, embodiments of the present invention permit the user touch or click on a display projected in the actual workspace in order to define task goals and constraints. A planning procedure fills in the gaps and makes this information something that the robot can execute. This "teach-by-touch" approach frees the user from having to program the robot either offline or by actually handling the robot itself, which requires the robot to provide a training mode that allows for such handling.

Accordingly, in a first aspect, the invention relates to method of training a robot situated in a workspace. In various embodiments, the method comprises the steps of (a) representing the robot in a 3D coordinate space encompassing at least a portion of the workspace; (b) detecting a user gesture within the workspace, the gesture indicating a location, and based on the detected movement, projecting an interface onto the workspace at the indicated location; (c) detecting gestural user selections of an element of the projected interface, the element of the projected interface corresponding to a robot control function; and (d) causing the robot to execute the control function.

In various embodiments, the user gesture is movement of a device, and selections of elements are detected based on a position of the device relative to the projected interface. For example, the device may be a wand having a fiducial thereon. The control function may include at least one task goal and at least one task constraint. A task goal may comprise or correspond to an object placement location. A task constraint may comprise or correspond to an obstacle between an initial object location and the object placement location.

In some embodiments, the method further includes the step of analyzing a recorded image of the workspace to computationally define constraints associated with the task goals. The method may include the step of computing motion plans for the robot based on the task goals and the task constraints, and the robot is caused to execute the control functions in accordance with the computed motion plans.

In various embodiments, the method further includes the step of, following the gestural user selection of an interface element, detecting gestural user selection of an item within the workspace upon which the robot control function is to operate, and the robot is caused to execute the control function on the selected item.

In another aspect, the invention pertains to a robot controller for use with a robot in a workspace including a projector and a camera. In various embodiments, the robot controller comprises a processor; a memory for storing (i) images obtained by the camera and (ii) instructions executable by the processor to provide perception and interaction modules configured for (i) representing the robot in a 3D coordinate space including at least a portion of the workspace, (ii) analyzing at least one first stored image to detect a user gesture within the workspace, the gesture indicating a location, (iii) based on the detected movement, causing the projector to project an interface onto the workspace at the indicated location, and (iv) analyzing at least one second stored image obtained by the camera subsequent to the at least one first stored image to detect a gestural user selection of an element of the projected interface, the element of the projected interface corresponding to a robot control function; and a planning module configured for (i) computing robot instructions corresponding to the robot control function and (ii) causing the robot to execute the robot instructions.

In some embodiments, the robot controller is within the robot, while in other embodiments, the controller is external to the robot and communicates therewith via a network. The user gesture may be movement of a device, where selections of elements are detected based on a position of the device relative to the projected interface.

The control function may include at least one task goal and at least one task constraint, and the perception module may be further configured for analyzing a stored image of the workspace to computationally define constraints associated with the task goals. The planning module may be further for computing motion plans for the robot based on the task goals and the task constraints.

In some embodiments, wherein the perception module is further configured for detecting gestural user selection of an item within the workspace upon which the robot control function is to operate.

As used herein, the terms "approximately" and "substantially" mean ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 3B conceptually illustrates operation of an embodiment of the invention.

DETAILED DESCRIPTION

Figure 1A:
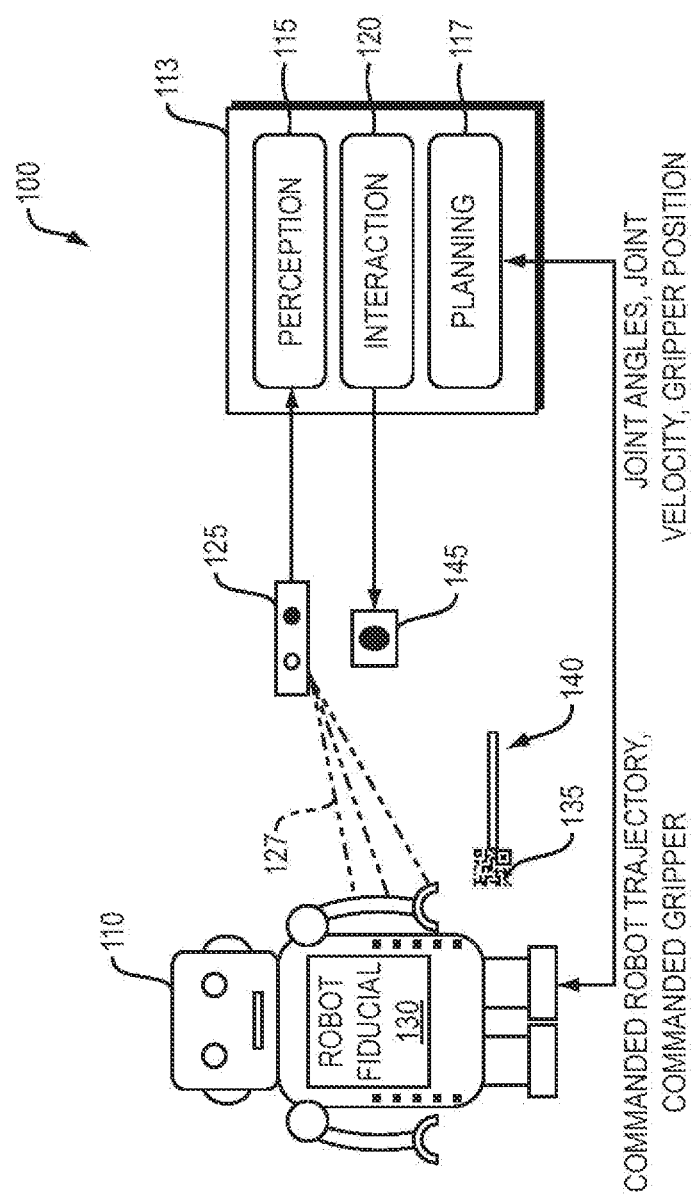
FIG. 1A is a high-level system block diagram of a system in accordance with embodiments of the invention.

Refer first to FIG. 1A, which illustrates a representative system 100 in accordance with embodiments of the present invention. In the illustrated embodiment, a robot 110 to be programmed includes a control block 113, which for convenience is illustrated separately from the robot. The control block 113 includes a perception module 115, a planning module 117, and an interaction module 120. In typical implementations, these modules are implemented within the robot 110, e.g., as part of its internal controller. This is not necessary, however, and in fact the modules 115, 117, 120 can be realized in a separate device. For example, the modules may be implemented on a server in wireless and/or wired contact with numerous robots 110 and separately servicing each of the robots.

A conventional camera 125, preferably an RGB-D camera that combines red-green-blue color information with per-pixel depth information (that is, the camera 125 assigns to each recorded pixel a color and a depth coordinate relative to the camera), is located within or adjacent to the workspace (or, in some embodiments, is part of the robot 110). Visible to the camera 125—i.e., within its field of view 127—is a fiducial 130 on the robot and another fiducial 135 on a wand or other pointing device 140 used within the workspace, i.e., the camera 125 and its field of view 127 are sufficient to encompass both the robot fiducial 130 and the wand fiducial 135 when the robot 110 is trained as discussed herein. The fiducials 130, 135 may be, for example, a 2D barcode or other camera-visible indicium, e.g., an APRILTAG fiducial.

It should be stressed that the use of fiducials is not essential; any suitable means of establishing the relative pose of the robot 110 relative to the camera 125 and the pose of the wand 140 relative to the camera 125 can be employed. Furthermore, alternatives to the wand 140 are also possible, e.g., 3D hand recognition can be employed to allow the user to signal with his hand, e.g., by pointing. Suitable machine-vision algorithms facilitating hand and gesture recognition are well-known in the art and include, for example, pattern matching against a template. See, e.g., Pradipa & Kavitha, "Hand Gesture Recognition—Analysis of Various Techniques, Methods and Their Algorithms," *ICIET* ' 14, p. 2003, the entire disclosure of which is hereby incorporated by reference.

Figure 1B:
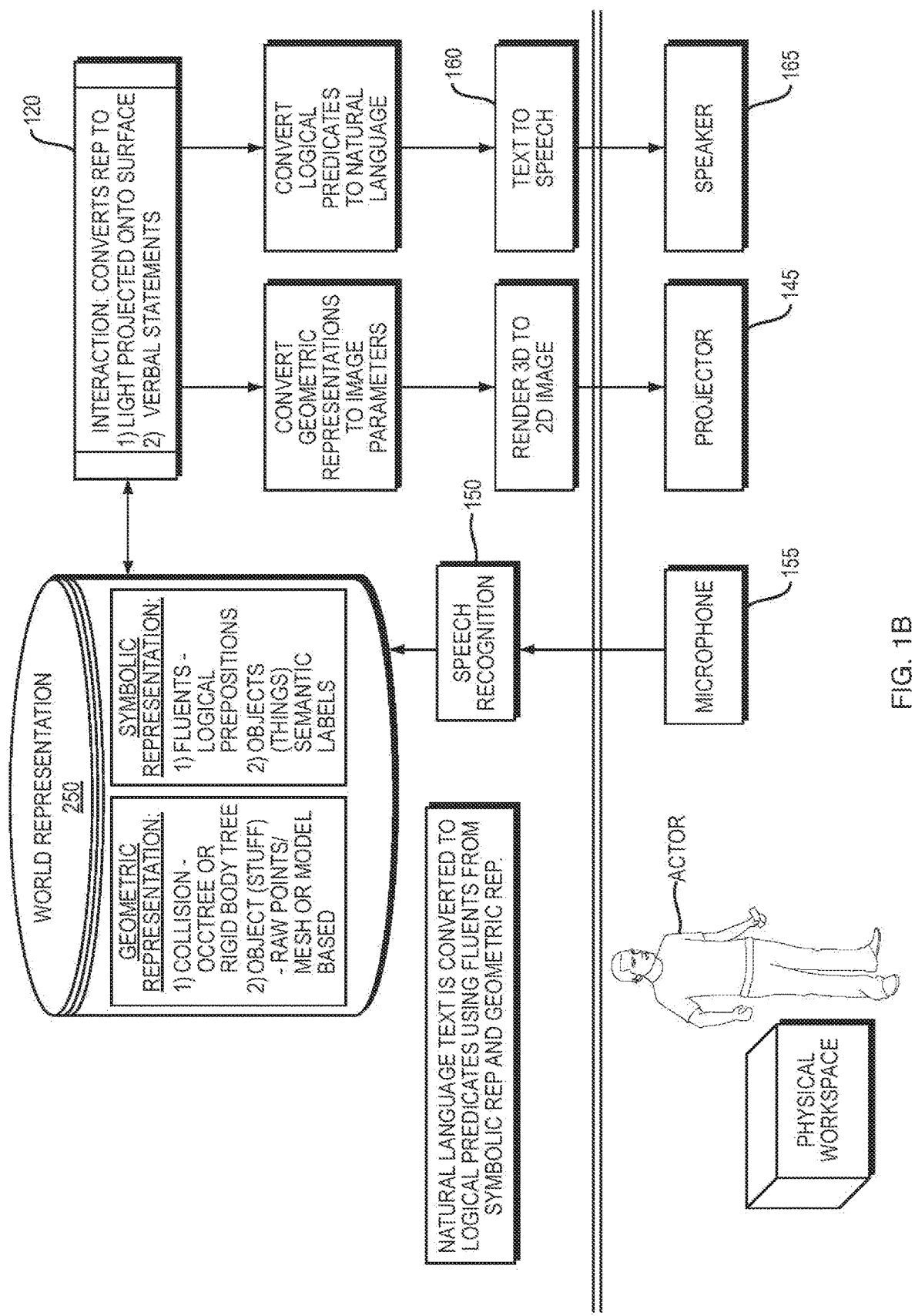
FIG. 1B is a high-level system block diagram of an embodiment using both visual and voice interfaces.

Another approach, illustrated in FIG. 1B, utilizes voice recognition as an alternative modality to receive commands. A conventional speech-recognition module 150 converts speech detected by a microphone 155 into natural-language text; for example, the speech-recognition module 150 may utilize readily available APIs to GOOGLE or AMAZON speech-to-text applications or other voice algorithms. The speech-recognition module 150 matches keywords in the resulting text stream to text in symbolic fluents and parameters for those fluents; see, e.g., Tellex et al., "Asking for Help Using Inverse Semantics," available at http://cs.brown.edu/courses/csci2951-k/papers/tellex14.pdf incorporated by reference herein. The fluents and their parameters may reside in a world representation 250, which is described in greater detail below. Hence, as used herein, the term "gesture" includes physical and/or verbal manifestations of intent, including movement of a hand or wand in the former case and uttering a command in the latter case. (For convenience of presentation, the ensuing discussion will mostly assume use of the wand 140.)

The camera 127 is paired with a projector 145 whose function and operation are described below. The perception module 115 receives visual information from the camera 125 and continuously or periodically extracts the 3D position of the fiducials 130, 135. This function may be performed completely by (or under the direction of) the perception module 115 or may be shared with the camera 125, which may perform image preprocessing or object identification. The planning module 117 sends commands to the robot 110 and receives mechanical state information (typically joint angles and velocity of the robot arm(s), gripper position, etc.) from the robot 110. The interaction module 120 operates the projector 145 to facilitate interaction with the user as described below. It should be understood that the term "projection," as used herein, refers to any modality for creating a visible image, real or virtual, on the workspace and from which a user may make selections. For example, the projector 145 may be a virtual- or augmented-reality goggles, and the projection is the image made visible to the user and appearing on the workspace as perceived by the user.

Figure 2:
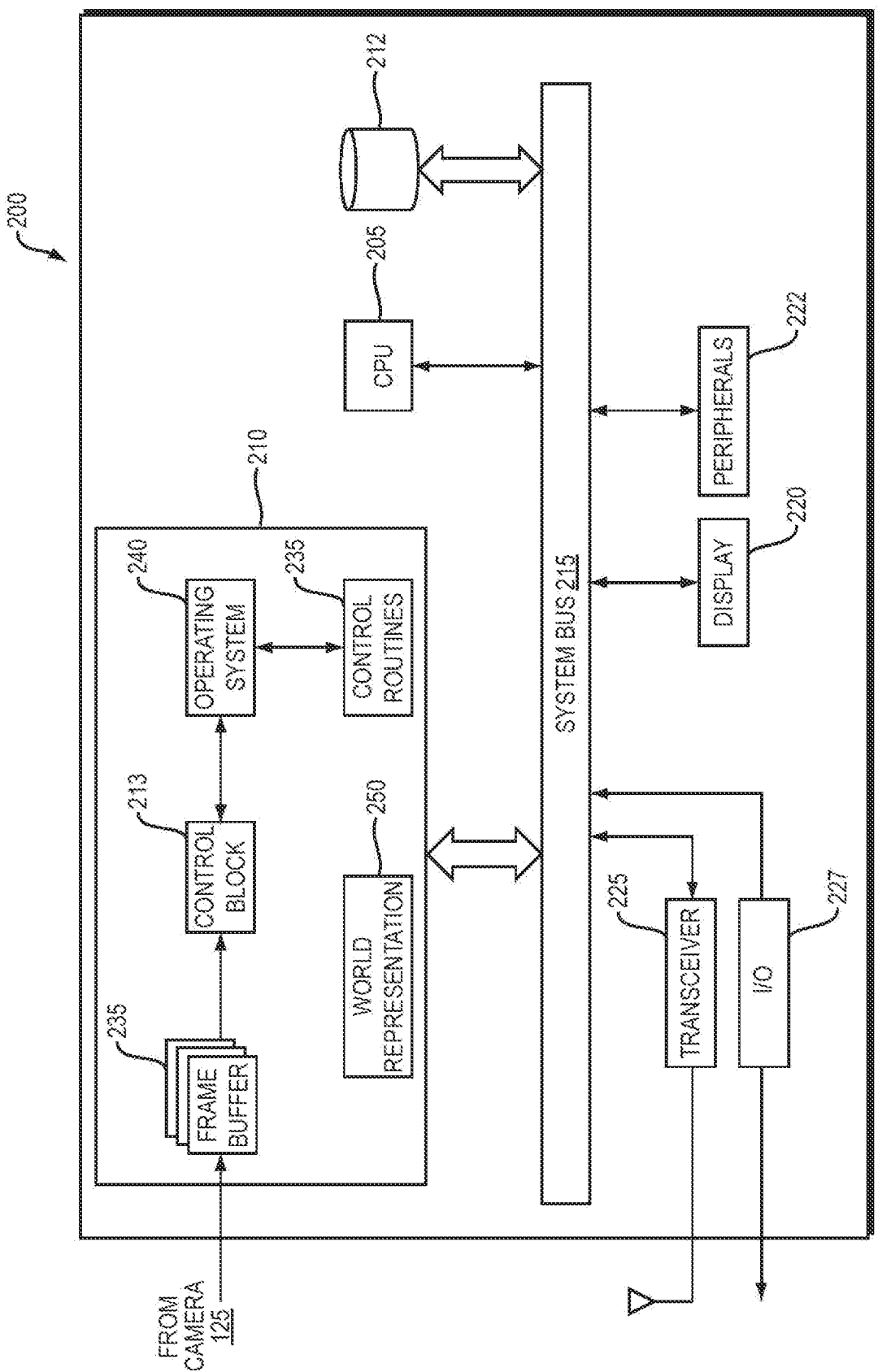
FIG. 2 schematically illustrates a robot controller in accordance with embodiments of the invention.

FIG. 2 illustrates the integration of the control block 113 within a representative control system 200 of the robot 110. The control system 200 includes a central processing unit (CPU) 205 (e.g., a quad-core Intel processor), system memory 210, and one or more non-volatile mass storage devices (such as one or more hard disks and/or optical storage units) 212. The system 200 further includes a bidirectional system bus 215 over which the CPU 205, memory 210, and storage device 212 communicate with each other as well as with internal or external input/output (I/O) devices such as an LCD display 220 and control peripherals 222, which may include buttons or other control devices on the robot 110. The control system 200 may also include a communication transceiver 225 and one or more I/O ports 227. The transceiver 225 and I/O ports 227 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, ZigBee, IrDa, near-field communication (NFC), or other suitable protocol. Furthermore, components of the system may communicate through a combination of wired or wireless paths, and communication may involve both computer and telecommunications networks. The I/O ports 227 also provide control and acutation commands to the various motors and joints of the robot 110.

The CPU 205 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

The system memory 210 contains a series of frame buffers 235, i.e., partitions that store, in digital form, images obtained by the camera 125. System memory 210 contains instructions, conceptually illustrated as a group of modules, that control the operation of the CPU 205 and its interaction with the other hardware components. These include the control block 113, conventional robot control routines 235 (which include suitable drivers to operate the robot 110), and an operating system 240 (e.g., WINDOWS or LINUX) directs the execution of low-level, basic system functions such as memory allocation, file management and operation of the mass storage device 212. The control block 113 (in particular, the perception module 115) may analyze the images in the frame buffers 235 to identify the fiducials 130, 135 and interpret user gestures. Any suitable programming language may be used to implement without undue experimentation the functions of the control block 113 as described herein. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

During an initialization phase, the position of the projector 145 relative to the camera 125 is established in the coordinate system of the 3D workspace using any suitable calibration technique, e.g., manual measurement and entry into the memory 210. In particular, a suitable approach to calibration takes in images of checkerboard patterns on a posterboard and a checkerboard pattern projected by the projector. This outputs the relative pose and camera model parameters between the projector 145 and the camera 125. Next, the position of the robot 110 relative to the camera 125 is established in the 3D workspace coordinate system. This may be accomplished by locating the fiducial 130 on the camera image of the robot and measuring its size; the size of the fiducial, combined with its known location on the robot, are sufficient to establish the distance of the robot from the camera and thereby calibrate the camera's depth perception in the room coordinate system.

In an alternative embodiment, which does not require fiducials, a 3D computer-aided design (CAD) model of the gripper is computationally fitted to 3D voxels of the gripper in the scene. From one or more views, the relative position of the gripper and the robot may be regressed to the camera 125. In particular, provided with a robot arm and gripper with known kinematics and a CAD model of the gripper, as well as a camera 125 with 3D capability, registration may be accomplished using an initial guess of a camera-to-robot coordinate transformation, e.g., using a visible indicium on the robot, a manually entered location, or the last-used registration data. In particular, the following algorithm may be employed:

1) Manually or automatically place gripper in camera view

2) Use initial guess of camera-robot registration plus forward kinematics of robot arm to guess how gripper should look to camera 3) Segment just those cloud points around where gripper should be 4) Perform iterative closest point (ICP) using segmented cloud and CAD model 5) Use new gripper position and arm encoder values to compute a new a camera-to-robot coordinate transformation 6) Repeat steps 1-5 until operating workspace is sufficiently covered 7) Run regression over the resulting transform for each point to find the best camera-robot registration.

The ICP algorithm is described, for example, in Segal et al., "Generalized-ICP," available at http://www.roboticsproceedings.org/rss05/p21.pdf. Camera-object registration using human-guided ICP is described in Marion et al., "LabelFusion: A Pipeline for Generating Ground Truth Labels for Real RGBD Data of Cluttered Scenes," *Computer Vision and Pattern Recognition*, available at https://arxiv.org/abs/1707.04796.

Figure 3A:
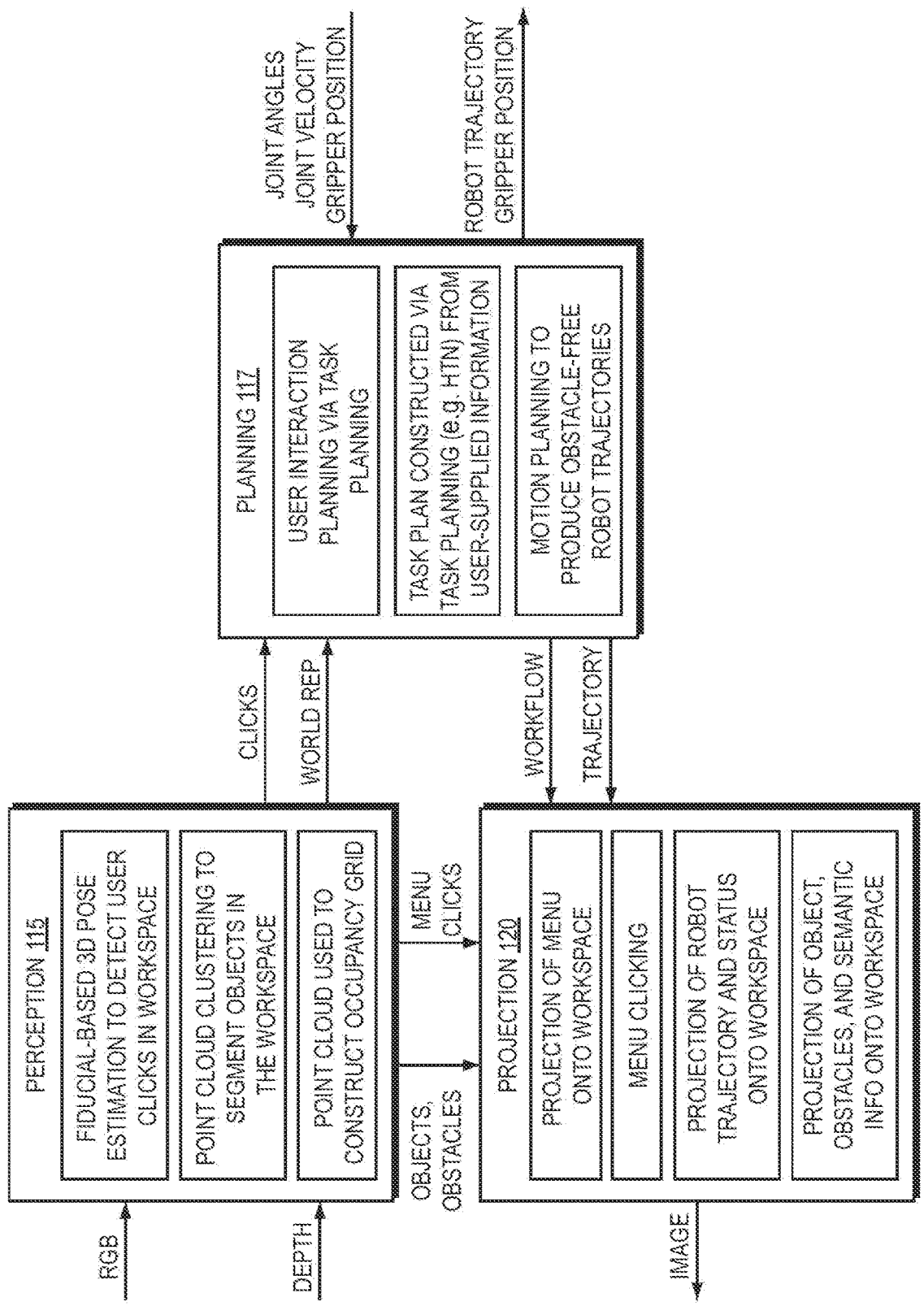
FIG. 3A is a block diagram illustrating functionality associated with key modules of various embodiments.

The functions performed by the perception, planning, and interaction modules 115, 117, 120 are illustrated in greater detail in FIG. 3A. In essence, these modules cooperate to enable a user to train the robot 110 through workspace interaction rather than direct programming; the interface via which the user interacts with the robot 110 is projected into the workspace, enabling the user to train the robot while walk through the workspace and, if necessary, maintaining a safe distance from the robot 110. The perception module 115 receives a 3D point cloud (rather than a complete depth map) of the workspace surrounding the robot from the camera 125; the point cloud may consist of or comprise RGB and depth data. The perception module 115 computes a 3D segmentation of the cloud, e.g., using Euclidean clustering with point-normal thresholding. Object (e.g., workpiece) surfaces and work surfaces may be clustered as separate entities, and each cluster may be represented as a collection of points in 3D space. With additional reference to FIGS. 1B and 2, these representations collectively form a "world representation" 250 of the workspace that is stored in the main memory 250 and/or storage device 212. The world representation may include an occupancy grid, which marks pixels or voxels of the workspace as empty or occupied, and facilitates correlation of a gesture with selection items of a projected menu. Detecting user gestures indicative of selections or other commands may involve estimating the pose of the wand 140. The perception module 115 sends detected gestures (e.g., clicks) to the planning module 117, and may notify the planning module of updates to the world representation 250. (In general, the world representation 250 is a data structure accessible to the entire control block 113.)

The interaction block 120 serves as the interface between user and robot, allowing the user both to define the task and get feedback from the robot 110 as to what the robot understands about the workspace and how it will act. As noted, an important innovation is use of the actual workspace itself to help the user tell the robot what it should do. In particular, as directed by the interaction module 120, the projector 125 may project a menu and/or graphical interface to the user within the workspace; for example, the menu may appear on the wall or span multiple surfaces in the workspace. The user makes selections from the menu using the wand 140, and the planning module 117, "knowing" both the location of the wand fiducial 135 and the projected menu options, recognizes selection of a menu option as the user points at it with the wand 140. In this way, the user can "explain" a task to the robot 110 as s/he would to another human. As detailed below, the planning module 117 interprets the commands and creates a workflow program that the robot can run.

In operation, with additional reference to FIG. 3B, the user initially moves the wand 140 within the workspace and indicates where the menu 310 is desired. The perception module 115 geometrically computes the minimum distance from the wand fiducial 135 to any point cluster. Using the surface cluster closest to the fiducial 135, the perception module 115 fits a planar model to the surface cluster points. To create a menu, the interaction module 120 computes a set of 3D points that defines the menu with the appropriate number of selection buttons; for example, the lower left corner of a rectangular menu may be defined as the point in the plane closest to the wand fiducial 135. Menu points are defined in the workspace and used to direct projection of the menu. Using projection mapping, the interaction module 120 projects a 3D-defined color menu onto a 2D color image, and that image is displayed by the projector 145 where the user has indicated. Using conventional rendering techniques, the interaction module 115 may distort the image so that perspective is maintained in the projected image relative to the features of the workspace.

Based on the 3D segmentation, the projected menu buttons have known 3D workspace coordinates, and these are used to detect button "clicks"—i.e., gestures made by the user using the wand 140. A click may be detected using a metric based on the 3D marker position and the 3D position of a button defined by a set of 3D points. For example, a 3D box may be defined around a rectangular button and if the fiducial 135 enters the box, the button is deemed "clicked." A button click may be registered in the workspace by, for example, changing the projected color of the button to indicate that it has been selected. The menu buttons allow users to initiate task-definition modes that turn user clicks into task planning goals and constraints. For example, clicking an "Object" button allows the user to select (using marker clicks in the workspace) an object in the workspace to be manipulated by the robot. Clicking the "Obstacle" button as indicated in FIG. 3B allows the user to indicate an obstacle.

More generally, user clicks and other detected gestures can define a task. Clicks that define explicit task goals can include manipulation goals such as object pick goals and object place goals; end-effector placement goals such as drill, insert, screw, and snap goals; object-relative goals such as place object A relative to object B, place cap on bottle; and volume/area goals can allow the user to define a volume of space for an object or end-effector goal, or to pick/place from. User clicks can also define explicit task constraints. Such constraints can involve the workpiece(s) (e.g., objects to be manipulated and secondary objects such as jigs, guide rails, receiving components like connectors), obstacles (e.g., objects to avoid collision with), and "keep-out" zones that define points or regions in free space that the robot and its appendages should not enter. The perception module 115 may process the camera images to define implicit task constraints based on, e.g., perceived obstacles based on pose estimation from the point-cloud data. The perception module 115 may also define implicit task goals, e.g., a range of points on a perceived object that are accessible to a robot drill.

The planning module 117 bridges the gap between task definition and task execution, computing a world representation from explicit and implicit task definitions. In particular, the planning module 117 utilizes task-planning and motion-planning methodologies to create the robot workflow program from the tasks and constraints provided by the user and/or the perception module 115. Obstacles and free-space may be represented by a discrete 3D occupancy grid map, and the planning block may compile poses of all objects and workpieces within the workspace. The planning module 117 may compute a task plan using a hierarchical task network (HTN), which takes as input task goals and constraints and computes a sequence of high-level actions until an executable action (primitive) is reached. For example, move, pick, and place actions correspond to primitives, while filling a box with objects represents a high-level goal. The task-planning methodology may be hybrid, i.e., extend over temporal, spatial, and resource reasoning, in addition to sequencing and goal achievement. Suitable algorithms are described, for example, in Stock et al., "Hierarchical Hybrid Planning in a Mobile Service Robot," *Proc. of 38th Annual German Conference on AI* (2015) and Bercher et al., "Hybrid Planning: Theoretical Foundations and Practical Applications" (2015) (available at https://pdfs.semanticscholar.org/38ad/5aed5df5adabf314442d95713f055bb1a92b.pdf), the entire disclosures of which are hereby incorporated by reference.

The task plan is translated into motion plans for each primitive (e.g., target joint angles achieved using a situationally appropriate joint velocity) by a conventional robot motion planner using, for example, the well-known rapidly-exploring random tree (RRT) algorithm and trajectory waypoints, e.g., taking as input an occupancy grid and a goal and computing robot trajectory commands and gripper commands to implement the goal.

The interaction module 120 may employ workspace projection to give the user feedback on task definition and execution. By converting 3D points/poses into a 2D image and projecting the image onto workspace surfaces, various aspects of task definition and task execution may be presented to the user. For example, the planning module 117 may report, via projected images, that a user goal is not feasible, or that an execution plan could not be found or will result in a collision. Alternatively or in addition, as illustrated in FIG. 1B, the interaction module 120 may use text-to-speech capability to provide verbal feedback via a text-to-speech module 160 and a speaker 165. Once again readily available APIs to GOOGLE or AMAZON text-to-speech applications may be utilized by the text-to-speech module 160.

Figure 4:
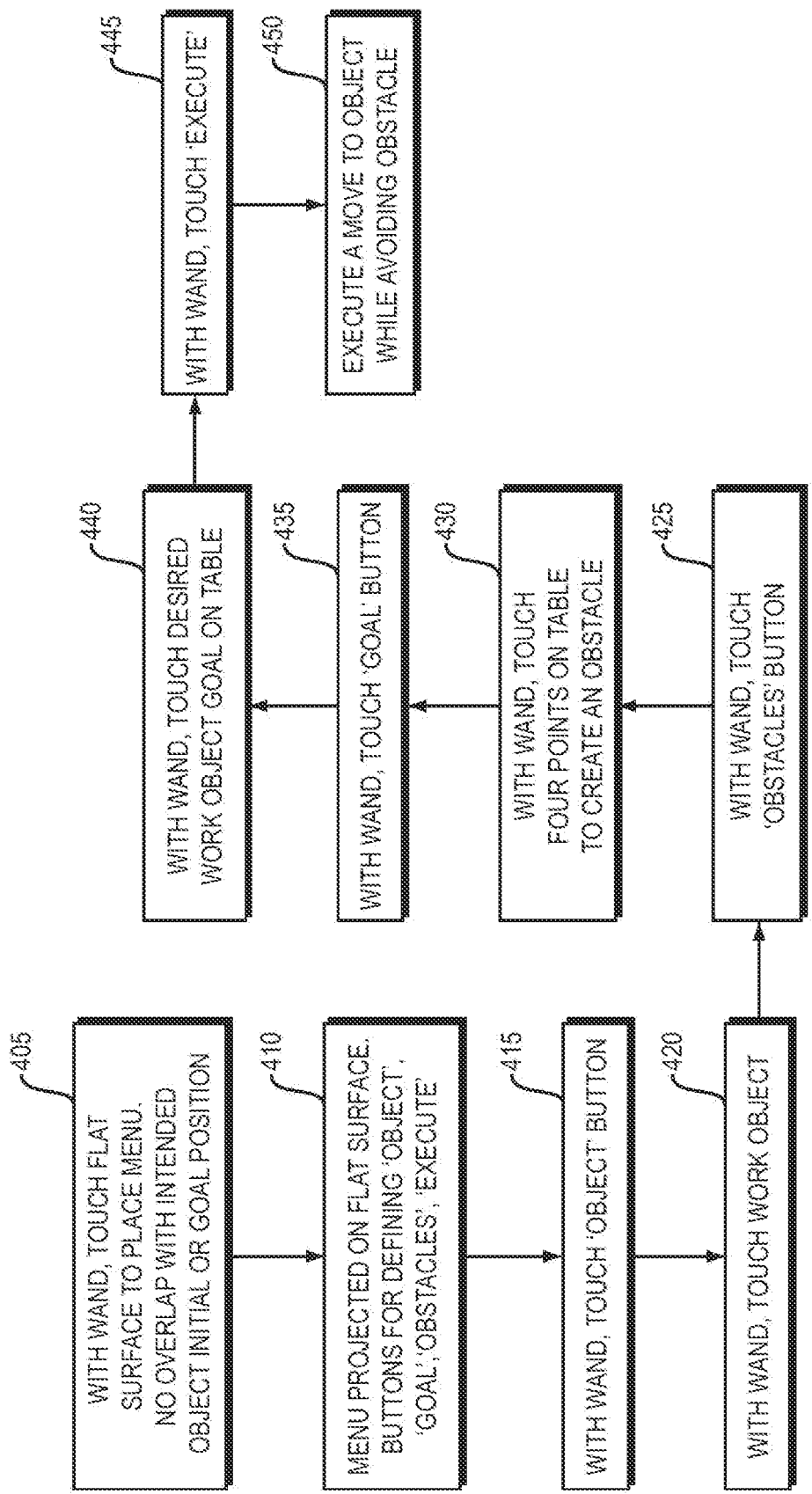
FIG. 4 is a flowchart illustrating a representative operation of an embodiment of the invention.

A representative sequence of interaction steps with an embodiment of the invention is shown in FIG. 4. In a first step 405, the user touches a surface (usually, but not necessarily, flat), and the interaction module 120 responsively causes projection of a selection menu on the pointed-to surface (step 410). Typically, the location of the projected menu is spatially distinct from where task-related activity takes place, i.e., the initial or goal position of an object to be manipulated. The projected menu contains a selection item labeled "object"—for example, the menu may have buttons for defining "object," "goal," "obstacles," and "execute"— and in step 415, the user touches (or otherwise gestures to indicate) the "object" selection item with the wand 140. The user then touches the actual work object with the wand 140 (step 420) to identify the work object as the subject of a robot task. In step 425, the user touches the "obstacles" button with the wand 140, and to define the obstacle, thereupon touches four points to indicate a region between the initial and goal position (step 430). The planning module 117 computationally "extrudes" the obstacle vertically as a 3D object from the indicated four points.

In step 435, the user selects the "goal" button with the wand 140 and thereupon touches, again with the wand 140, a location to be designated as the goal location (step 440). The planning module 117 may define the goal location not as a point but as a small area, e.g., a circle on the touched surface with an area larger than the designed work object. When the user selects "execute" from the projected menu using the wand 140 (step 445), the planning module 117 computes a trajectory (using, e.g., the RRT algorithm) that will allow the robot to bring the designated object from the initial position to the goal position while avoiding the defined obstacle, and causes the robot 110 to execute a grasp, a move to goal while avoiding the obstacle, and a release of the object at the designated goal location.

As noted above, the perception, planning and interaction modules 115, 117, 120 may be implemented by computer-executable instructions, such as program modules, that are executed by a conventional computer. Generally, program modules include routines, programs, objects, components, data structures, etc. that performs particular tasks or implement particular abstract data types. Those skilled in the art will appreciate that the invention may be practiced with various computer system configurations, including multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of training a robot situated in a physical workspace, the method comprising the steps of:
    (a) computationally representing, by a controller, the robot in a 3D coordinate space corresponding to at least a portion of the workspace;
    (b) electronically detecting, by the controller, a first user gesture associated with the workspace and corresponding to a task goal, wherein the task goal includes the robot manipulating a physical object;
    (c) electronically detecting, by the controller, a second user gesture associated with the workspace and corresponding to a task constraint;
    (d) computing, by the controller, a motion plan for the robot based on the task goal and the task constraint; and
    (e) causing, by the controller, the robot to execute control functions corresponding to the task goal without violating the task constraint in accordance with the computed motion plan.

2. The method of claim 1, further comprising the step of analyzing a recorded image of the workspace to computationally define at least one implicit constraint associated with the task goal.

3. The method of claim 1, further comprising the step of detecting user selection of an item within the workspace upon which the robot control function is to operate, the robot executing the control function on the selected item.

4. The method of claim 1, wherein the task goal is a manipulation goal.

5. The method of claim 4, wherein the manipulation goal comprises an object pick goal and an object place goal including a placement location.

6. The method of claim 5, wherein the task constraint comprises an obstacle between an initial object location and the object placement location.

7. The method of claim 1, wherein the task goal is an end-effector goal.

8. The method of claim 1, wherein the task goal is an object-relative goal.

9. The method of claim 1, wherein the task goal is a volume/area goal.

10. For use with a robot in a physical workspace, a robot controller comprising:
    a processor;
    a memory for storing instructions executable by the processor to provide:
        perception and interaction modules configured for (i) computationally representing the robot in a 3D coordinate space corresponding to at least a portion of the workspace, (ii) detecting user gestures associated with the workspace and indicating a task goal and a task constraint, wherein the task goal includes the robot manipulating a physical object; and
        a planning module configured for (i) computing a motion plan for the robot based on the task goal and the task constraint and (ii) causing the robot to execute control functions corresponding to the task goal without violating the task constraint in accordance with the computed motion plan.

11. The robot controller of claim 10, wherein the robot controller is within the robot.

12. The robot controller of claim 10, wherein the controller is external to the robot and communicates therewith via a network.

13. The robot controller of claim 10, wherein the perception and interaction modules are further configured to analyze a recorded image of the workspace to computationally define at least one implicit constraint associated with the task goal.

14. The robot controller of claim 10, wherein the perception and interaction modules are further configured to detect user selection of an item within the workspace upon which the robot control function is to operate, the robot controller being configured to responsively cause the robot to execute the control function on the selected item.

15. The robot controller of claim 10, wherein the task goal is a manipulation goal.

16. The robot controller of claim 10, wherein the manipulation goal comprises an object pick goal and an object place goal including a placement location.

17. The robot controller of claim 16, wherein the task constraint comprises an obstacle between an initial object location and the object placement location.

18. The robot controller of claim 10, wherein the task goal is an end-effector goal.

19. The robot controller of claim 10, wherein the task goal is an object-relative goal.

20. The robot controller of claim 10, wherein the task goal is a volume/area goal.

\* \* \* \* \*